United States Patent
Ma et al.

(10) Patent No.: US 12,152,908 B2
(45) Date of Patent: *Nov. 26, 2024

(54) RANGE FINDER AND LENS ASSEMBLY FOR DISPLAY THEREOF

(71) Applicants: Sintai Optical (Shenzhen) Co., Ltd., Guandong (CN); Asia Optical Co., Inc., Taichung (TW)

(72) Inventors: Fang-Li Ma, ShenZhen (CN); Yue-Ye Chen, ShenZhen (CN); Bin Liu, ShenZhen (CN); Jun-Wei Che, ShenZhen (CN); We-Jie Lou, ShenZhen (CN); Hua-Tang Liu, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/165,965

(22) Filed: Feb. 8, 2023

(65) Prior Publication Data

US 2023/0194256 A1   Jun. 22, 2023

Related U.S. Application Data

(63) Continuation of application No. 16/819,296, filed on Mar. 16, 2020, now Pat. No. 11,604,064.

(30) Foreign Application Priority Data

Apr. 24, 2019  (CN) .......................... 201910335409.1

(51) Int. Cl.
  *G01C 3/08*   (2006.01)
  *G02B 5/04*   (2006.01)
  *G02B 27/14*  (2006.01)

(52) U.S. Cl.
  CPC .................. *G01C 3/08* (2013.01); *G02B 5/04* (2013.01); *G02B 27/142* (2013.01)

(58) Field of Classification Search
  CPC .......... G02B 5/04; G02B 5/208; G02B 27/14; G02B 27/12; G02B 27/142; G02B 27/145;
  (Continued)

(56) References Cited

U.S. PATENT DOCUMENTS 9,341,815 B1   5/2016  Hsueh et al.
10,234,283 B2  3/2019  Chang et al.
(Continued)

FOREIGN PATENT DOCUMENTS

CN   101034200 A   9/2007
CN   101490504 A   7/2009
(Continued)

OTHER PUBLICATIONS

English translation of CN 105445942. (Year: 2016).*
(Continued)

*Primary Examiner* — Jie Lei
(74) *Attorney, Agent, or Firm* — McClure, Qualey & Rodack, LLP

(57) ABSTRACT

A lens assembly for display includes a display, a lens assembly, and a prism assembly. The display emits a first light beam. The lens assembly includes a first, second, and third lenses. The prism assembly includes a first, second prisms, and an optical multilayer film, wherein the first prism includes a first, second, and third surfaces and the second prism includes a fourth, fifth, sixth, seventh, and eighth surfaces. The lens assembly for display satisfies at least one of following conditions: $0.60 \leq D_{in}/TTL \leq 0.75$; $0.28 \leq D_{in}/f_{123} \leq 0.35$; $4.56 \text{ mm} \leq D_{in} \leq 5.02 \text{ mm}$; wherein $D_{in}$ is an effective optical diameter of the light incident surface, (Continued)

TTL is an interval from the light incident surface to the light emitting surface along the optical axis, and $f_{123}$ is an effective focal length of a combination of the first lens, the second lens, and the third lens.

19 Claims, 6 Drawing Sheets

(58) Field of Classification Search
CPC ...... G02B 27/126; G02B 26/10; G02B 23/10; G02B 23/18; G02B 23/04; G01S 7/4812; G01S 17/08; G01C 3/08; G01C 3/02
USPC .... 359/201.1, 351, 355, 365, 399, 403, 857, 359/861, 489.08, 583, 638, 639, 629; 356/3, 4.01, 5.05
See application file for complete search history.

(56) References Cited

U.S. PATENT DOCUMENTS

| | | | |
|---|---|---|---|
| 11,604,064 B2* | 3/2023 | Ma | G01C 3/08 |
| 2007/0229982 A1 | 10/2007 | Minakawa et al. | |
| 2014/0327976 A1 | 11/2014 | Chen | |
| 2015/0029599 A1 | 1/2015 | Huang | |
| 2017/0090192 A1 | 3/2017 | Iwasaki et al. | |
| 2017/0276927 A1 | 9/2017 | Chen et al. | |
| 2018/0203205 A1 | 7/2018 | Cao et al. | |
| 2019/0049704 A1 | 2/2019 | Ishii et al. | |
| 2019/0086646 A1 | 3/2019 | Chen et al. | |

FOREIGN PATENT DOCUMENTS

| | | |
|---|---|---|
| CN | 101819316 A | 9/2010 |
| CN | 102087394 A | 6/2011 |
| CN | 102279458 A | 12/2011 |
| CN | 104007538 A | 8/2014 |
| CN | 105445942 A | 3/2016 |
| CN | 105806308 A | 7/2016 |
| CN | 106154525 A | 11/2016 |
| CN | 106444003 A | 2/2017 |
| CN | 106526811 A | 3/2017 |
| CN | 106842548 A | 6/2017 |
| CN | 107219621 A | 9/2017 |
| CN | 107229111 A | 10/2017 |
| CN | 107688224 A | 2/2018 |
| CN | 108427183 A | 8/2018 |
| IN | 101034200 A | 9/2007 |
| JP | 2005077714 A | 3/2005 |
| JP | 2007093888 A | 4/2007 |
| JP | WO2017170284 A1 | 2/2019 |
| TW | 201115180 A | 5/2011 |
| TW | 201200928 A | 1/2012 |
| TW | 201232088 A | 8/2012 |
| TW | 201508333 A | 3/2015 |

OTHER PUBLICATIONS

Journal of Wuhan Technical University of Surveying and Mapping 1986, 11(4): 83-91; Publication Date: Dec. 31, 1986 Title: Design for Infra-red Geodimeter BHC-5 and Its Accuracy Analysis.

* cited by examiner

RANGE FINDER AND LENS ASSEMBLY FOR DISPLAY THEREOF

CROSS REFERENCE TO RELATED APPLICATIONS

This application is a Continuation of pending U.S. patent application Ser. No. 16/819,296, filed Mar. 16, 2020, now U.S. Pat. No. 11,604,064, and entitled "Range Finder and Lens Assembly for Display Thereof".

BACKGROUND OF THE INVENTION

Field of the Invention

The invention relates to a range finder and lens assembly for display thereof.

Description of the Related Art

Today's range finder includes displays to show information about the distance of the measured object, wherein the eyepiece can see information about the target, background, and display at the same time. However, the conventional range finder with displays cannot provide bright and clear target and display information without affecting the background color and visual effect. It is clear that the conventional range finder with displays can't satisfy today's requirements. Therefore, the range finder needs a new structure in order to increase the brightness of the display without affecting the background color.

BRIEF SUMMARY OF THE INVENTION

The invention provides a range finder and lens assembly for display thereof, which can simultaneously increase the brightness of the display without affecting the background color, and greatly improve the visual effect.

The lens assembly for display in accordance with an exemplary embodiment of the invention includes a display, a lens assembly, and a prism assembly. The display emits a first light beam. The lens assembly includes a light incident surface and a light emitting surface, both of which are arranged in order along an optical axis, wherein the first light beam enters the lens assembly through the light incident surface and exits the lens assembly by the light emitting surface. The prism assembly includes a first prism, a second prism, and an optical multilayer film, wherein the first prism includes a first surface, a second surface, and a third surface; the second prism includes a fourth surface, a fifth surface, a sixth surface, a seventh surface, and an eighth surface; the fifth surface faces the third surface; and the optical multilayer film is disposed between the third surface and the fifth surface. The lens assembly further includes a first lens, a second lens, and a third lens, all of which are arranged in order along the optical axis. The second lens is disposed between the first lens and the third lens. The first lens includes a first light incident surface, and the first light incident surface is the light incident surface of the lens assembly. The third lens includes a third light emitting surface, and the third light emitting surface is the light emitting surface of the lens assembly. A second light beam enters the first prism through the first surface are totally reflected from the second surface to the optical multilayer film, the optical multilayer film reflects a part of the second light beam causing the part of the second light beam to exit the first prism by the second surface. The first light beam exits the lens assembly, and enters the second prism through the eighth surface, and exits the second prism by the fifth surface, and enters the first prism through the optical multilayer film, the optical multilayer film allows a part of the first light beam to pass through, finally, the part of the first light beam exits the first prism by the second surface, where the part of the second light beam and the part of the first light beam coincide on the second surface. The lens assembly for display satisfies at least one of following conditions: $0.60 \leq D_{in}/TTL \leq 0.75$; $0.28 \leq D_{in}/f_{123} \leq 0.35$; $4.56 \text{ mm} \leq D_{in} \leq 5.02 \text{ mm}$; wherein $D_{in}$ is an effective optical diameter of the light incident surface, TTL is an interval from the light incident surface to the light emitting surface along the optical axis, and $f_{123}$ is an effective focal length of a combination of the first lens, the second lens, and the third lens.

The lens assembly for display in accordance with another embodiment of the invention includes a display, a lens assembly, and a prism assembly. The display emits a first light beam. The lens assembly includes a light incident surface and a light emitting surface, both of which are arranged in order along an optical axis, wherein the first light beam enters the lens assembly through the light incident surface and exits the lens assembly by the light emitting surface. The prism assembly includes a first prism, a second prism, and an optical multilayer film, wherein the first prism includes a first surface, a second surface, and a third surface; the second prism includes a fourth surface, a fifth surface, a sixth surface, a seventh surface, and an eighth surface; the fifth surface faces the third surface; and the optical multilayer film is disposed between the third surface and the fifth surface. The lens assembly further includes a first lens, a second lens, and a third lens, all of which are arranged in order along the optical axis. The second lens is disposed between the first lens and the third lens. The first lens includes a first light incident surface, and the first light incident surface is the light incident surface of the lens assembly. The third lens includes a third light emitting surface, and the third light emitting surface is the light emitting surface of the lens assembly. A second light beam enters the first prism through the first surface are totally reflected from the second surface to the optical multilayer film, the optical multilayer film reflects a part of the second light beam causing the part of the second light beam to exit the first prism by the second surface. The first light beam exits the lens assembly, and enters the second prism through the eighth surface, and exits the second prism by the fifth surface, and enters the first prism through the optical multilayer film, the optical multilayer film allows a part of the first light beam to pass through, finally, the part of the first light beam exits the first prism by the second surface, where the part of the second light beam and the part of the first light beam coincide on the second surface. The lens assembly for display satisfies at least one of following conditions: $1.10 \leq D_{out}/TTL \leq 1.25$; $0.50 \leq D_{out}/f_{123} \leq 0.57$; wherein $D_{out}$ is an effective optical diameter of the eighth surface, TTL is an interval from the light incident surface to the light emitting surface along the optical axis, and $f_{123}$ is an effective focal length of a combination of the first lens, the second lens, and the third lens.

In another exemplary embodiment, the optical multilayer film covers the third surface; the first light beam enters the lens assembly through the first light incident surface of the first lens and exits the lens assembly by the third light emitting surface of the third lens; and the lens assembly for display satisfies: $0.50 \leq D_{out}/f_{123} \leq 0.57$; wherein $D_{out}$ is an effective optical diameter of the eighth surface and $f_{123}$ is the effective focal length of the combination of the first lens, the second lens, and the third lens.

In yet another exemplary embodiment, the optical multilayer film covers the third surface; the first light beam enters the lens assembly through the first light incident surface of the first lens and exits the lens assembly by the third light emitting surface of the third lens; and the lens assembly for display satisfies: $1.10 \leq D_{out}/TTL \leq 1.25$; wherein $D_{out}$ is an effective optical diameter of the eighth surface and TTL is the interval from the light incident surface to the light emitting surface along the optical axis.

In another exemplary embodiment, the light emitting surface and the optical axis intersect at a second intersection point; an outermost edge of the effective optical diameter of the light incident surface and the second intersection point form a first virtual edge; the first virtual edge forms a first angle with the optical axis; the light incident surface and the optical axis intersect at a first intersection point; an outermost edge of the effective optical diameter of the light emitting surface and the first intersection point form a second virtual edge; the second virtual edge forms a second angle with the optical axis; and the first angle is more than or equal to 15 degrees and less than or equal to 17 degrees or the second angle is more than or equal to 28 degrees and less than or equal to 31 degrees.

In yet another exemplary embodiment, the lens assembly for display satisfies at least one of following conditions: $0.96$ degrees/mm $\leq A_1/f_{123} \leq 1.07$ degrees/mm; $1.78$ degrees/mm $\leq A_2/f_{123} \leq 2.04$ degrees/mm; wherein $A_1$ is an angle of the first angle, $A_2$ is an angle of the second angle, and $f_{123}$ is an effective focal length of a combination of the first lens, the second lens, and the third lens.

In another exemplary embodiment, the prism assembly further includes a roof prism which includes a ninth surface, a tenth surface, and a ridge surface, wherein the ninth surface faces the second surface; a third light beam enters the first prism through the first surface is totally reflected from the second surface to the optical multilayer film, the optical multilayer film allows the third light beam to pass through and enters the second prism through the fifth surface, and exits the second prism by the seventh surface; and the part of the first light beam exits the first prism by the second surface and enters the roof prism through the ninth surface.

In yet another exemplary embodiment, the lens assembly for display satisfies: $0.80\% \leq E_1/E_0 \leq 0.95\%$; wherein $E_0$ is an energy of the first light beam emitted from the display and $E_1$ is an energy of the first light beam passes through the lens assembly.

In another exemplary embodiment, the optical multilayer film covers the third surface; the first light beam enters the lens assembly through the first light incident surface of the first lens and exits the lens assembly by the third light emitting surface of the third lens; and the lens assembly for display satisfies at least one of following conditions: $0.60 \leq D_{in}/TTL \leq 0.75$; $4.56$ mm $\leq D_m \leq 5.02$ mm; wherein $D_{in}$ is an effective optical diameter of the light incident surface and TTL is the interval from the light incident surface to the light emitting surface along the optical axis.

In yet another exemplary embodiment, the lens assembly for display satisfies: $0.28 \leq D_{in}/f_{123} \leq 0.35$; wherein $D_{in}$ is the effective optical diameter of the light incident surface and $f_{123}$ is an effective focal length of a combination of the first lens, the second lens, and the third lens.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

In the following description, visible light beam 2 can be regarded as second light beam, infrared light beam 201R can be regarded as third light beam, and visible light beam 71 can be regarded as first light beam.

Figure 1A:
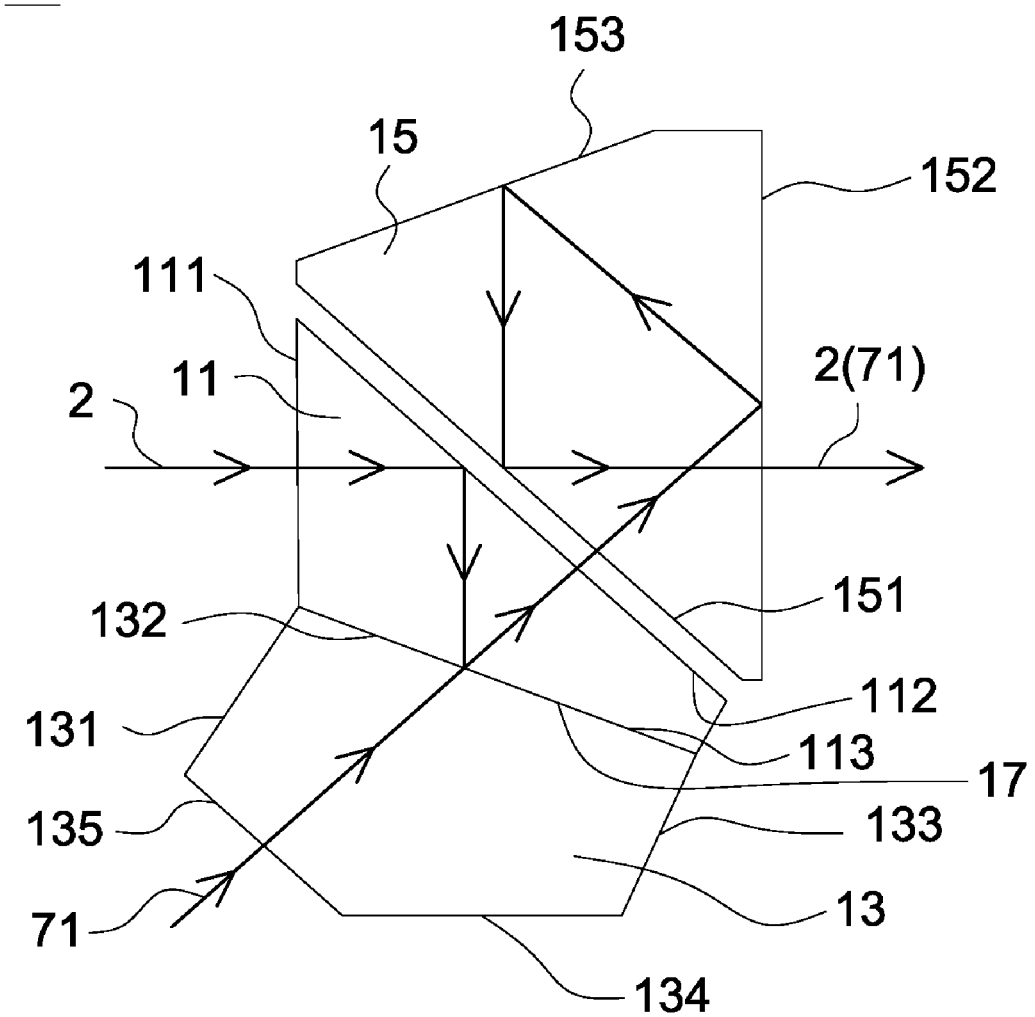
FIG. 1A is an optical path diagram of a visible light beam of a prism assembly in accordance with an embodiment of the invention.
Figure 1B:
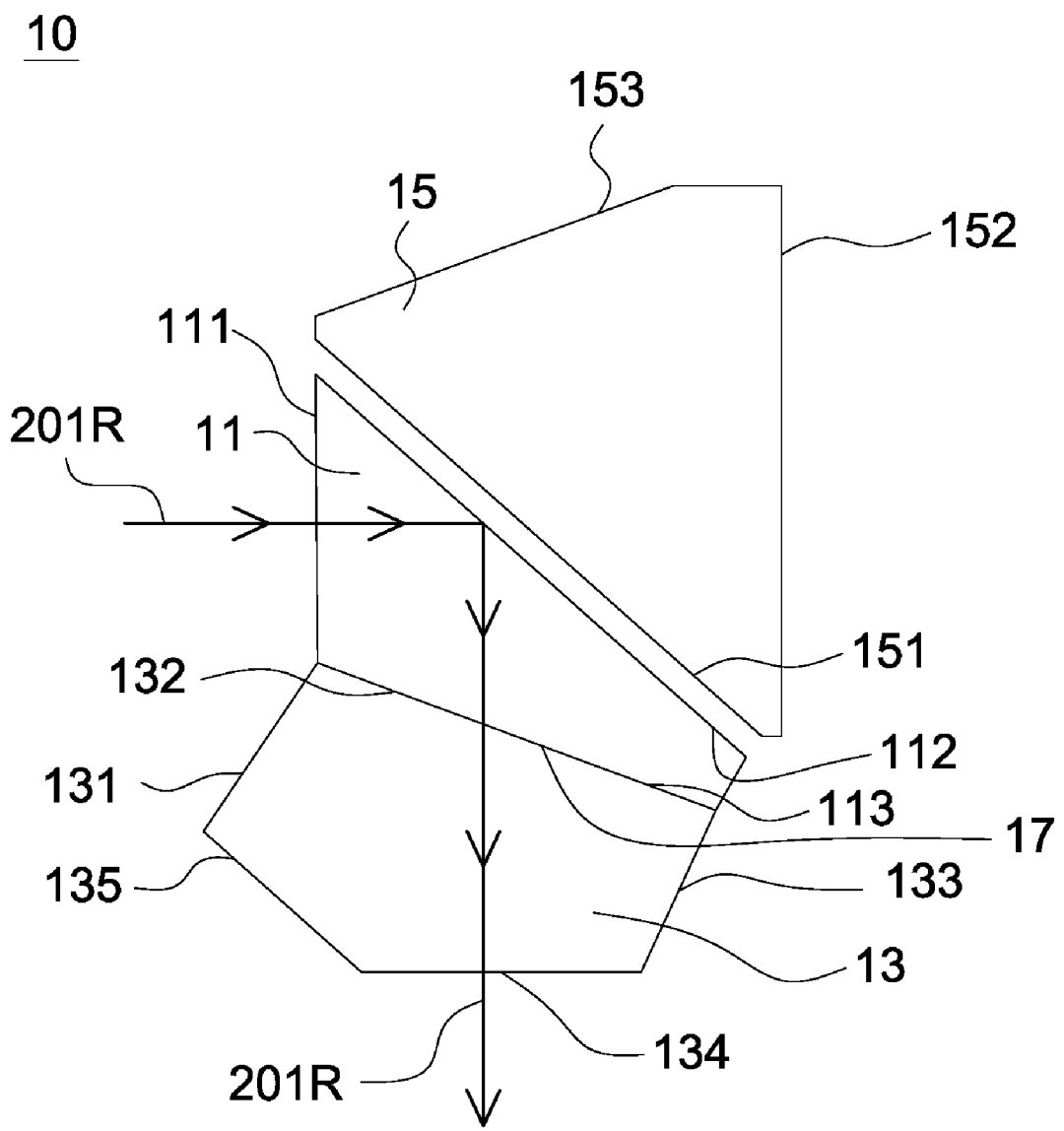
FIG. 1B is an optical path diagram of an infrared light beam of the prism assembly in accordance with the embodiment of the invention.
Figure 1C:
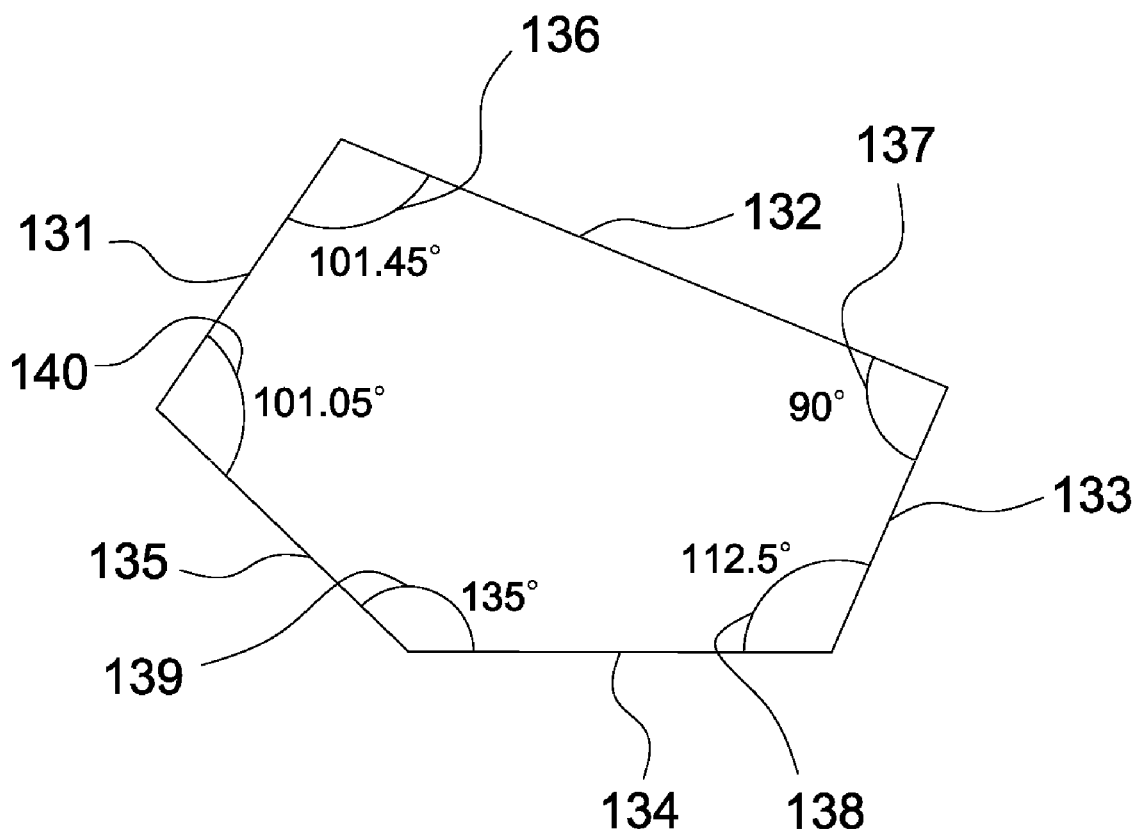
FIG. 1C shows each angle between adjacent surfaces of the second prism in FIG. 1A.

Referring to FIG. 1A, FIG. 1B, and FIG. 1C, FIG. 1A is an optical path diagram of a visible light beam of a prism assembly in accordance with an embodiment of the invention, FIG. 1B is an optical path diagram of an infrared light beam of the prism assembly in accordance with the embodiment of the invention, and FIG. 1C shows each angle between adjacent surfaces of the second prism in FIG. 1A. As shown in FIG. 1A, the prism assembly 10 includes a first prism 11, a second prism 13, and a roof prism 15. The first prism 11 includes a first surface 111, a second surface 112, and a third surface 113. The third surface 113 is coated with an optical multilayer film 17. The optical multilayer film 17 allows infrared light beam to pass through and visible light beam partially to penetrate and partially to reflect. The second prism 13 includes a fourth surface 131, a fifth surface 132, a sixth surface 133, a seventh surface 134, and an eighth surface 135, wherein the fifth surface 132 faces the third surface 113 of the first prism 11 and is cemented. The roof prism 15 includes a ninth surface 151, a tenth surface 152, and a ridge surface 153, wherein the ninth surface 151 faces the second surface 112 of the first prism 11. As shown in FIG. 1C, the angle 136 between the fourth surface 131 and the fifth surface 132 of the second prism 13 is equal to 101.45 degrees, the angle 137 between the fifth surface 132 and the sixth surface 133 of the second prism 13 is equal to 90 degrees, the angle 138 between the sixth surface 133 and the seventh surface 134 of the second prism 13 is equal to 112.5 degrees, the angle 139 between the seventh surface 134 and the eighth surface 135 of the second prism 13 is equal to 135 degrees, and the angle 140 between the eighth surface 135 and the fourth surface 131 of the second prism 13 is equal to 101.05 degrees.

When a visible light beam 2 enters the first prism 11, it directly penetrates the first surface 111 toward the second surface 112 and undergoes a total internal reflection on the second surface 112. Then, the propagation direction of the visible light beam 2 is changed, and the visible light beam 2 enters the third surface 113 and the optical multilayer film 17. The optical multilayer film 17 allows infrared light beam and part of visible light beam to pass through but reflects the other part of visible light beam, so that part of the visible light beam 2 is reflected to change propagation direction toward the second surface 112 and exits the first prism 11 by the second surface 112, and then enters the roof prism 15. The visible light beam 2 directed to the roof prism 15 will penetrate the ninth surface 151 directly, and then the visible light beam 2 will be totally reflected from the tenth surface 152, the ridge surface 153, and the ninth surface 151 to change the propagation direction and exits the roof prism 15 by the tenth surface 152 finally.

When another visible light beam 71 enters the second prism 13 through the eighth surface 135, it will be directed to the fifth surface 132, the optical multilayer film 17, and the third surface 113. The visible light beam 71 will directly penetrate the fifth surface 132. The optical multilayer film 17 allows infrared light beam and part of the visible light beam to pass through but reflects the other part of the visible light beam, so that part of the visible light beam 71 penetrates the optical multilayer film 17 and enters the first prism 11 through the third surface 113, and finally exits the first prism 11 by the second surface 112, and then enters the roof prism 15. The visible light beam 71 directed to the roof prism 15 directly penetrates the ninth surface 151, and then the visible light beam 71 is totally reflected from the tenth surface 152, the ridge surface 153, and the ninth surface 151 to change the propagation direction. Finally, the visible light beam 71 exits the roof prism 15 by tenth surface 152.

The above visible light beam 2 and visible light beam 71 coincide on the second surface 112.

Referring to FIG. 1B, when an infrared light beam 201R enters the first prism 11, it penetrates the first surface 111 toward to the second surface 112. The infrared light beam 201R directed to the second surface 112 is totally reflected, so that the infrared light beam 201R changes its propagation direction and enters the third surface 113 and the optical multilayer film 17. The optical multilayer film 17 allows infrared light beam and part of the visible light beam to pass through but reflects the other part of the visible light beam, so that the infrared light beam 201R directly penetrates the third surface 113 and the optical multilayer film 17, and enters the second prism 13 through the fifth surface 132. The infrared light beam 201R directed to the second prism 13 directly penetrates the seventh surface 134 to exit the second prism 13.

In summary, the visible light beam 2 and the infrared light beam 201R will be separated and propagate in different directions if the visible light beam 2 and the infrared light beam 201R simultaneously enter the prism assembly 10 through the first surface 111. The visible light beam 2 exits the prism assembly 10 by the tenth surface 152 without changing its propagation direction. The infrared light beam 201R exits the prism assembly 10 by the seventh surface 134 with changing its propagation direction.

Figure 2A:
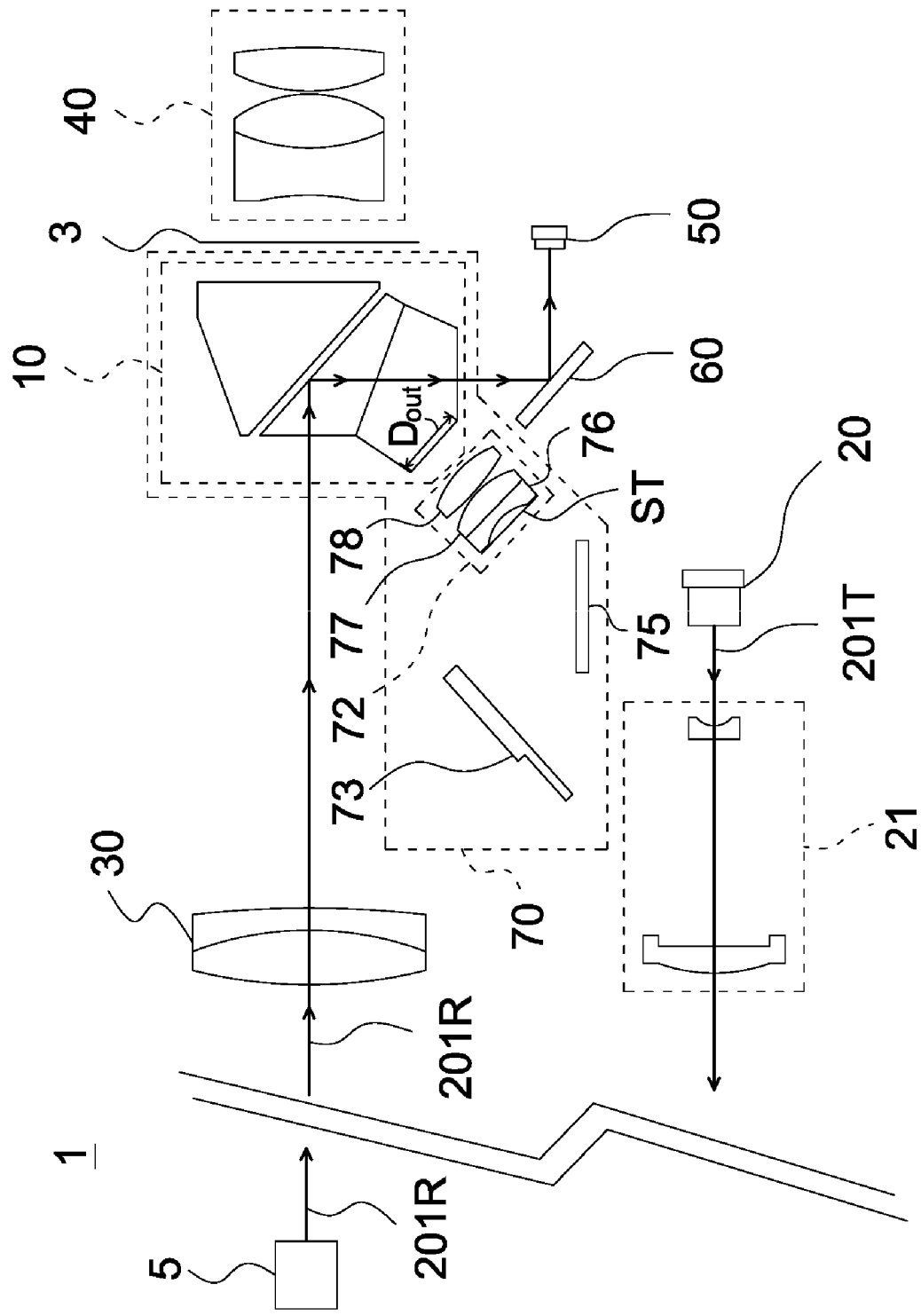
FIG. 2A depicts the structure and the infrared light beam path of a range finder in accordance with the embodiment of the invention.

Referring to FIG. 1B and FIG. 2A, FIG. 2A depicts the structure and the infrared light beam path of a range finder in accordance with the embodiment of the invention. The range finder 1 includes an optical transmitter 20, a collimator 21, an objective lens 30, an eyepiece 40, an optical receiver 50, a mirror 60, and a lens assembly for display 70. The lens assembly for display 70 includes a prism assembly 10, a lens assembly 72, a display 73, and a mirror 75. The lens assembly 72 includes a stop ST, a first lens 76, a second lens 77, and a third lens 78. In operation, an infrared light beam 201T is emitted by the optical transmitter 20. The infrared light beam 201T passes through the collimator 21 first and then directed to a measured object 5. The measured object 5 reflects the infrared light beam 201T, so that an infrared light beam 201R which reflects from the measured object 5 is directed to the range finder 1. The infrared light beam 201R directed to the range finder 1 passes through the objective lens 30 first, and then enters the prism assembly 10 through the first surface 111 of the first prism 11. The infrared light beam 201R is totally reflected from the second surface 112, and then penetrates the third surface 113, the optical multilayer film 17, and the fifth surface 132, and finally exits the prism assembly 10 by the seventh surface 134, and then reflected by the mirror 60, and finally enters the optical receiver 50. After subsequent data processing, the distance of the measured object can be calculated and displayed on the display 73.

Figure 2B:
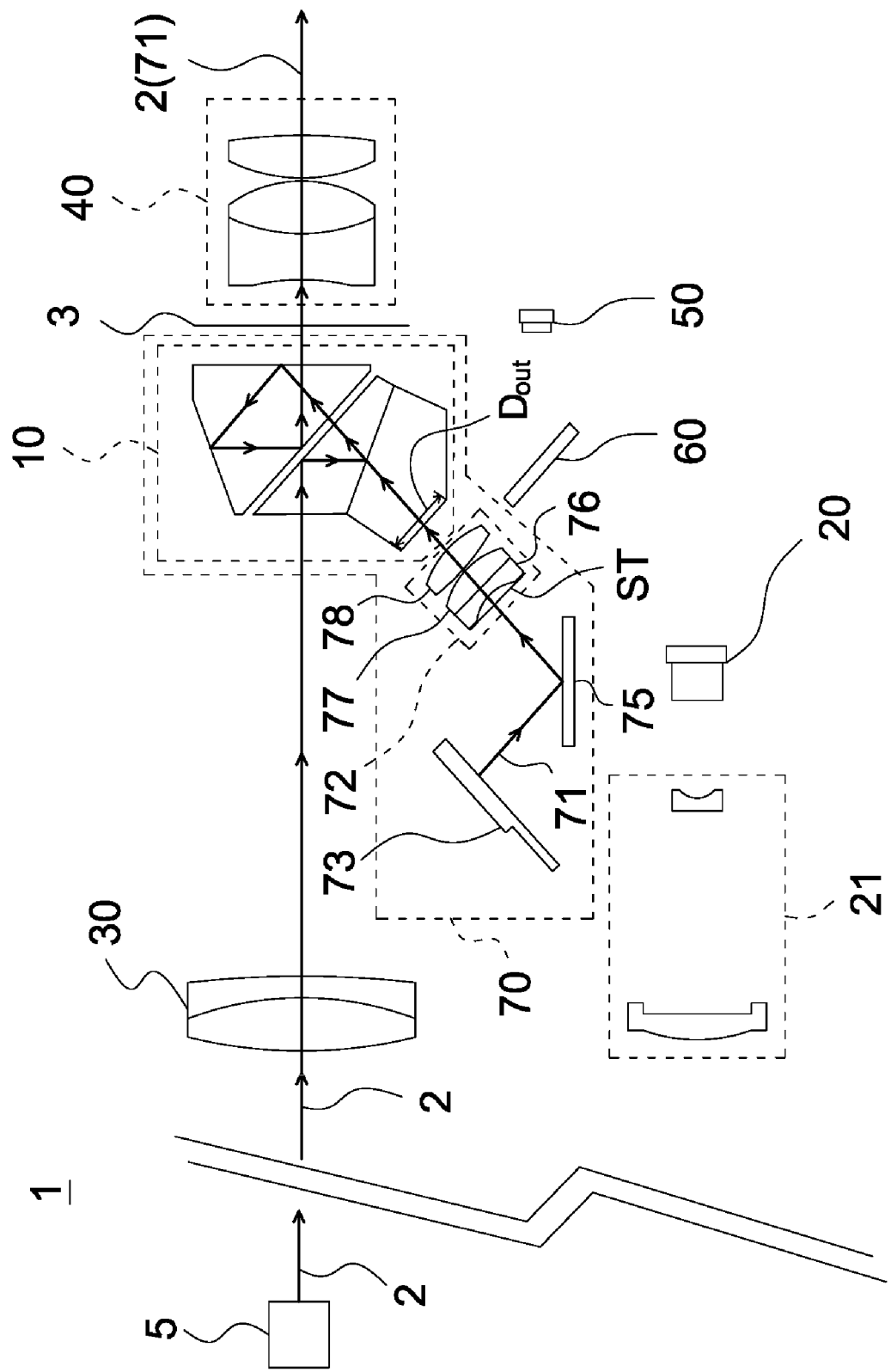
FIG. 2B is the structure and the visible light beam path of the range finder in accordance with the embodiment of the invention.

Referring to FIG. 1A and FIG. 2B, FIG. 2B is the structure and the visible light beam path of the range finder in accordance with the embodiment of the invention. The measured object 5 can reflect visible light beam. Therefore, a visible light beam 2 which reflects from the measured object 5 is directed to the range finder 1. The visible light beam 2 which is directed to the range finder 1 passes through the objective lens 30 first and then enters the prism assembly 10 through the first surface 111 of the first prism 11. The visible light beam 2 is totally reflected from the second surface 112 and directed to the third surface 113 and the optical multilayer film 17. The optical multilayer film 17 reflects part of the visible light beam 2 which exits the first prism 11 by the second surface 112 and enters the roof prism 15. The visible light beam 2 which is directed to the roof prism 15 penetrates the ninth surface 151 directly and then totally reflected from the tenth surface 152, the ridge surface 153, and the ninth surface 151 to change propagation direction respectively. Finally, the visible light beam 2 exits the roof prism 15 by the tenth surface 152 and enters the eyepiece 40. User can view the image of the measured object through the eyepiece 40.

The display 73 emits a visible light beam 71. The visible light beam 71 reflected by the mirror 75 first to change propagation direction and enters the stop ST, the first lens 76, the second lens 77, and the third lens 78 in order, and then enters the prism assembly 10 through the eighth surface 135 of the second prism 13, finally exits the roof prism 15 by the tenth surface 152 and imaging on the focal plane 3. User can view the image which is on the focal plane 3 through the eyepiece 40, that is, the user can see the distance of the measured object displayed on the display 73 through the eyepiece 40.

Figure 3:
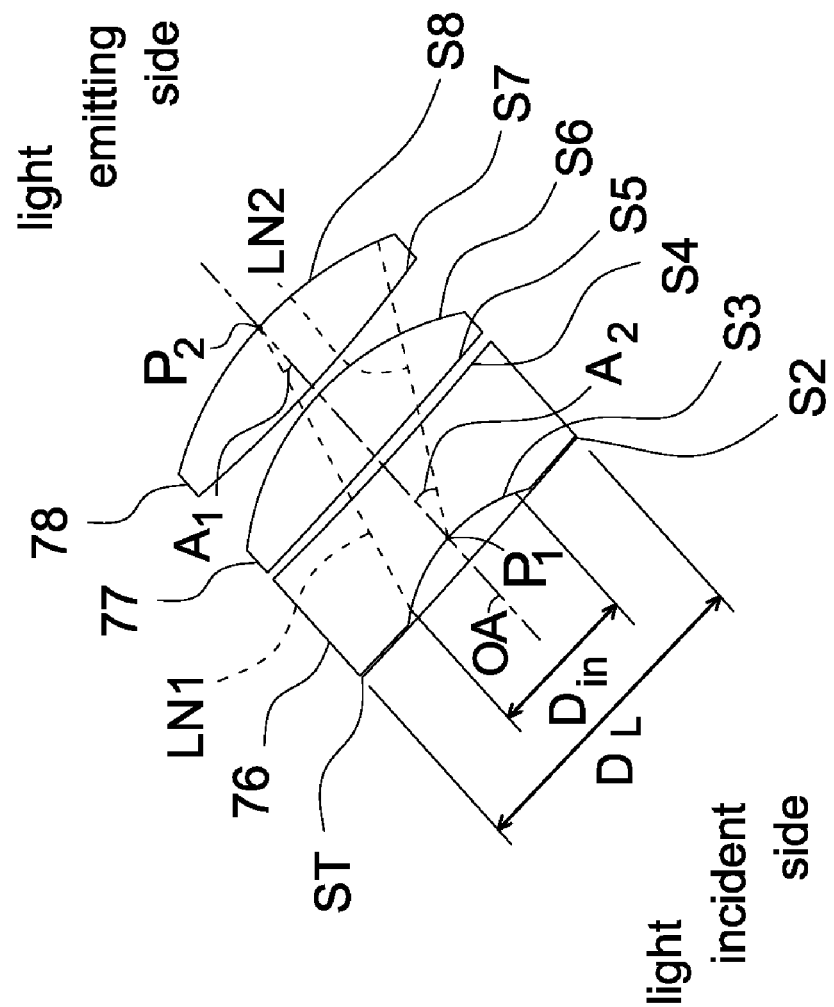
FIG. 3 is a partially enlarged diagram of a lens assembly for display in FIGS. 2A and 2B.

Referring to FIG. 3, FIG. 3 is a partially enlarged diagram of a lens assembly for display in FIGS. 2A and 2B. The lens assembly 72 includes a stop ST, a first lens 76, a second lens 77, and a third lens 78, all of which are arranged in order from a light incident side to a light emitting side along an optical axis OA. The first lens 76 includes a first light incident surface S3 and a first light emitting surface S4. The second lens 77 includes a second light incident surface S5 and a second light emitting surface S6. The third lens 78 includes a third light incident surface S7 and a third light emitting surface S8. The first light incident surface S3 is a light incident surface of the lens assembly 72 and the third light emitting surface S8 is a light emitting surface of the lens assembly 72. $D_L$ is an outer diameter of the lens assembly 72, $D_{in}$ is an effective optical diameter of the first light incident surface S3 of the first lens 76, and $D_{out}$ is an effective optical diameter of the eighth surface 135 of the second prism 13. The first light incident surface S3 and the optical axis OA intersect at a first intersection point $P_1$. An outermost edge of the effective optical diameter of the third light emitting surface S8 and the first intersection point $P_1$ form a second virtual edge LN2. The second virtual edge LN2 forms a second angle $A_2$ with the optical axis OA. The third light emitting surface S8 and the optical axis OA intersect at a second intersection point $P_2$. An outermost edge of the effective optical diameter of the first light incident surface S3 and the second intersection point $P_2$ form a first virtual edge LN1. The first virtual edge LN1 forms a first angle $A_1$ with the optical axis OA. The visible light beam 71 emitted from the display 73 passes the stop ST first and then passes the first lens 76 through the first light incident surface S3, finally exits the third lens 78 by the third light emitting surface S8. In addition, the lens assembly 72 composed of the stop ST, the first lens 76, the second lens 77, and the third lens 78 satisfies at least any of the following conditions:

$0.80\% \leq E_1/E_0 \leq 0.95\%$      (1)

$0.60 \leq D_{in}/TTL \leq 0.75$      (2)

$1.10 \leq D_{out}/TTL \leq 1.25$      (3)

$0.28 \leq D_{in}/f_{123} \leq 0.35$      (4)

$0.50 \leq D_{out}/f_{123} \leq 0.57$      (5)

15 degrees $\leq A_1 \leq$ 17 degrees      (6)

28 degrees $\leq A_2 \leq$ 31 degrees      (7)

2.10 degrees/mm $\leq A_1/TTL \leq$ 2.30 degrees/mm      (8)

3.95 degrees/mm $\leq A_2/TTL \leq$ 4.40 degrees/mm      (9)

0.96 degrees/mm $\leq A_1/f_{123} \leq$ 1.07 degrees/mm      (10)

1.78 degrees/mm $\leq A_2/f_{123} \leq$ 2.04 degrees/mm      (11)

4.56 mm $\leq D_{in} \leq$ 5.02 mm;      (12)

wherein $E_0$ is an energy of the visible light beam 71 emitted from the display 73, $E_1$ is an energy of the visible light beam 71 passes through the lens assembly 72, $D_{in}$ is an effective optical diameter of the first light incident surface S3, $D_{out}$ is an effective optical diameter of the eighth surface 135 of the second prism 13, TTL is an interval from the first light incident surface S3 to the third light emitting surface S8 along the optical axis OA, $f_{123}$ is an effective focal length of a combination of the first lens 76, the second lens 77, and the third lens 78, $A_1$ is an angle of the first angle, and $A_2$ is an angle of the second angle. By changing the design value of $D_L$, $D_{in}$, $D_{out}$ and satisfying at least any one of the conditions (1)-(12), the visual brightness of the lens assembly for display 70 (viewed through the eyepiece 40) can be effectively improved without affecting the background color. Two embodiments will be presented below to explain the effects of different values of $D_L$, $D_{in}$, $D_{out}$ and the values of conditions (1)-(12) on the visual brightness of the lens assembly for display 70.

Among the above conditions, if condition (1) is modified to $0.85\% \leq E_1/E_0 \leq 0.93\%$, there is a better effect for visual brightness.

Among the above conditions, if condition (2) is modified to $0.64 \leq D_{in}/TTL \leq 0.71$, there is a better effect for visual brightness.

Among the above conditions, if condition (4) is modified to $0.29 \leq D_{in}/f_{123} \leq 0.32$, there is a better effect for visual brightness.

Among the above conditions, if condition (8) is modified to 2.25 degrees/mm $\leq A_1/TTL \leq$ 2.26 degrees/mm, there is a better effect for visual brightness.

Among the above conditions, if condition (9) is modified to 4.15 degrees/mm $\leq A_2/TTL \leq$ 4.32 degrees/mm, there is a better effect for visual brightness.

Among the above conditions, if condition (11) is modified to 1.87 degrees/mm $\leq A_2/f_{123} \leq$ 1.94 degrees/mm, there is a better effect for visual brightness.

Referring to Table 1, Table 1 shows the optical specifications of the lens assembly 72 in accordance with a first embodiment of the invention. Table 1 shows that the effective focal length $f_{123}$ of the combination of the first lens 76, the second lens 77, and the third lens 78 is equal to 15.8045 mm and the interval TTL from the first light incident surface S3 to the third light emitting surface S8 along the optical axis OA is equal to 7.121 mm.

TABLE 1

| | | | | | |
|---|---|---|---|---|---|
| $f_{123}$ = 15.8045 mm TTL = 7.121 mm | | | | | |

| Surface Number | Radius of Curvature (mm) | Thickness (mm) | Effective Optical Diameter (mm) | Outer Diameter (mm) | Material | Remark |
|---|---|---|---|---|---|---|
| S1 | ∞ | 24.01 | 8.6 | — | — | Display 73(not shown) |
| S2 | ∞ | 0.79 | 4.53 | — | — | Stop ST |
| S3 | −4.708 | 2.136 | 4.56 | 9.4 | H-ZF4 | The First Lens 76 |
| S4 | 39.153 | 0.223 | 6.15 | 9.4 | — | |
| S5 | ∞ | 2.442 | 6.30 | 9.4 | H-ZK9A | The Second Lens 77 |
| S6 | −6.996 | 0.2 | 7.38 | 9.4 | — | |
| S7 | 30.672 | 2.12 | 8.17 | 9.4 | H-ZK9A | The Third Lens 78 |
| S8 | −12.292 | 2 | 8.4 | 9.4 | — | |
| S9 | ∞ | 15.7 | 8.08 | — | H-BAK7 | The Second Prism, The First Prism (not shown) |
| S10 | ∞ | 0.8 | 7.98 | — | — | Air Interval (not shown) |

TABLE 1-continued $f_{123}$ = 15.8045 mm  TTL = 7.121 mm

| Surface Number | Radius of Curvature (mm) | Thickness (mm) | Effective Optical Diameter (mm) | Outer Diameter (mm) | Material | Remark |
|---|---|---|---|---|---|---|
| S11 | ∞ | 36.8 | 7.97 | — | H-BAK7 | Roof Prism (not shown) |
| S12 | ∞ | 2.006 | 7.72 | — | — | Focal Plane (not shown) |
| S13 | ∞ | 4.692 | 7.78 | — | — | Eyepiece (not shown) |

Table 2 shows the parameters and condition values for conditions (2)-(12) in accordance with the first embodiment of the lens assembly 72. It can be seen from Table 2 that the lens assembly 72 of the first embodiment satisfies the conditions (2)-(12).

TABLE 2

| | | | | | |
|---|---|---|---|---|---|
| $D_L$ | 9.4 mm | $D_{in}$ | 4.56 mm | $D_{out}$ | 8.4 mm |
| $A_1$ | 16.01 degrees | $A_2$ | 29.56 degrees | | |
| $D_{in}$/TTL | 0.64 | $D_{out}$/TTL | 1.18 | $D_{in}/f_{123}$ | 0.29 |
| $D_{out}/f_{123}$ | 0.53 | $A_1$/TTL | 2.25 degrees/mm | $A_2$/TTL | 4.15 degrees/mm |
| $A_1/f_{123}$ | 1.01 degrees/mm | $A_2/f_{123}$ | 1.87 degrees/mm | | |

Referring to Table 3, Table 3 shows the optical specifications of the lens assembly 72 in accordance with a second embodiment of the invention. Table 3 shows that the effective focal length $f_{123}$ of the combination of the first lens 76, the second lens 77, and the third lens 78 is equal to 15.7745 mm and the interval TTL from the first light incident surface S3 to the third light emitting surface S8 along the optical axis OA is equal to 7.091 mm.

TABLE 3

$f_{123}$ = 15.7745 mm  TTL = 7.091 mm

| Surface Number | Radius of Curvature (mm) | Thickness (mm) | Effective Optical Diameter (mm) | Outer Diameter (mm) | Material | Remark |
|---|---|---|---|---|---|---|
| S1 | ∞ | 24.01 | 8.6 | — | — | Display 73(not shown) |
| S2 | ∞ | 0.79 | 5 | — | — | Stop ST |
| S3 | −4.548 | 2.136 | 5.02 | 9.4 | H-ZF4 | The First Lens 76 |
| S4 | 42.911 | 0.223 | 6.66 | 9.4 | — | |
| S5 | ∞ | 2.442 | 7.64 | 9.4 | H-ZK9A | The Second Lens 77 |
| S6 | −6.843 | 0.17 | 7.38 | 9.4 | — | |
| S7 | 34.903 | 2.12 | 8.23 | 9.4 | H-ZK9A | The Third Lens 78 |
| S8 | −11.936 | 2 | 8.4 | 9.4 | — | |
| S9 | ∞ | 15.7 | 8.35 | — | H-BAK7 | The Second Prism, The First Prism (not shown) |
| S10 | ∞ | 0.8 | 8.15 | — | — | Air Interval (not shown) |
| S11 | ∞ | 36.8 | 8.14 | — | H-BAK7 | Roof Prism (not shown) |
| S12 | ∞ | 2.006 | 7.68 | — | — | Focal Plane (not shown) |
| S13 | ∞ | 4.692 | 7.72 | — | — | Eyepiece (not shown) |

Table 4 shows the parameters and condition values for conditions (2)-(12) in accordance with the second embodiment of the lens assembly 72. It can be seen from Table 4 that the lens assembly 72 of the second embodiment satisfies the conditions (2)-(12).

TABLE 4

| $D_L$ | 9.4 mm | $D_{in}$ | 5.02 mm | $D_{out}$ | 8.4 mm |
|---|---|---|---|---|---|
| $A_1$ | 16.01 degrees | $A_2$ | 30.65 degrees | | |
| $D_{in}$/TTL | 0.71 | $D_{out}$/TTL | 1.18 | $D_{in}/f_{123}$ | 0.32 |
| $D_{out}/f_{123}$ | 0.53 | $A_1$/TTL | 2.26 degrees/mm | $A_2$/TTL | 4.32 degrees/mm |
| $A_1/f_{123}$ | 1.01 degrees/mm | $A_2/f_{123}$ | 1.94 degrees/mm | | |

Referring to Table 5, Table 5 shows a comparison table of the visual brightness of the lens assembly for display 70 with different $D_L$, $D_{in}$, and $D_{out}$ values in the first and second embodiments. The unit of brightness may be in lumen (lm) or in watt (W), the present invention will use watt as a unit of brightness. It can be seen from Table 5, the energy ratio of the visible light beam 71 before to after passes through the lens assembly for display 72 satisfies condition (1): 0.80%≤$E_1/E_0$≤0.95%. In the first embodiment, the energy $E_0$ of the visible light beam 71 before passes through the lens assembly for display 72 is equal to 63 watts and the energy $E_1$ of the visible light beam 71 after pass through the lens assembly for display 72 is equal to 0.54 watts. In the second embodiment, the energy $E_0$ of the visible light beam 71 before passes through the lens assembly for display 72 is equal to 63 watts and the energy $E_1$ of the visible light beam 71 after pass through the lens assembly 72 is equal 0.59 watts. It can be calculated that $E_1/E_0$ of the first embodiment and the second embodiment are 0.85% and 0.93% respectively, which shows that increasing the effective optical diameter of the first light incident surface S3, increasing the effective optical diameter of the eighth surface 135 of the second prism 13, or satisfying at least any one of the conditions (1)-(12) can effectively improve the visual brightness of the lens assembly for display 70.

TABLE 5

| | $D_L$(mm) | $D_{in}$(mm) | $D_{out}$(mm) | $E_0$(Watt) | $E_1$(Watt) | $E_1/E_0$ |
|---|---|---|---|---|---|---|
| The First Embodiment | 9.4 | 4.56 | 8.4 | 63 | 0.54 | 0.85% |
| The Second Embodiment | 9.4 | 5.02 | 8.4 | 63 | 0.59 | 0.93% |

In the above embodiment, the display 73 is a liquid crystal display (LCD) or an organic light emitting diode (OLED).

In the above embodiment, the optical transmitter 20 is a semiconductor laser band the optical receiver 50 is an avalanche photodiode (APD) or a photo diode (PD).

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A lens assembly for display comprising:
   a display which emits a first light beam;
   a lens assembly which comprises a light incident surface and a light emitting surface, both of which are arranged in order along an optical axis, wherein the first light beam enters the lens assembly through the light incident surface and exits the lens assembly by the light emitting surface; and
   a prism assembly which comprises a first prism, a second prism, and an optical multilayer film, wherein the first prism comprises a first surface, a second surface, and a third surface; the second prism comprises a fourth surface, a fifth surface, a sixth surface, a seventh surface, and an eighth surface; the fifth surface faces the third surface; and the optical multilayer film is disposed between the third surface and the fifth surface;
   wherein a second light beam enters the first prism through the first surface are totally reflected from the second surface to the optical multilayer film, the optical multilayer film reflects a part of the second light beam causing the part of the second light beam to exit the first prism by the second surface;
   wherein the first light beam exits the lens assembly, and enters the second prism through the eighth surface, and exits the second prism by the fifth surface, and enters the first prism through the optical multilayer film, the optical multilayer film allows a part of the first light beam to pass through, finally, the part of the first light beam exits the first prism by the second surface, where the part of the second light beam and the part of the first light beam coincide on the second surface;
   wherein the lens assembly for display satisfies at least one of following conditions:

0.60≤$D_{in}$/TTL≤0.75;

4.56 mm≤$D_{in}$≤5.02 mm;

wherein $D_{in}$ is an effective optical diameter of the light incident surface and TTL is an interval from the light incident surface to the light emitting surface along the optical axis.

2. The lens assembly for display as claimed in claim 1, wherein:
   the second prism comprises a plurality of prism angles and at least one of the prism angles is more than or equal to 90 degrees and less than or equal to 135 degrees;
   the optical multilayer film covers the third surface;
   the first light beam enters the lens assembly through the first light incident surface of the first lens and exits the lens assembly by the third light emitting surface of the third lens; and
   the lens assembly satisfies at least one of following conditions:

0.50≤$D_{out}/f_{123}$≤0.57;

0.28≤$D_{in}/f_{123}$≤0.35;

wherein $D_{out}$ is an effective optical diameter of the eighth surface, $D_{in}$ is the effective optical diameter of the light incident surface, and $f_{123}$ is an effective focal length of the lens assembly.

3. The lens assembly for display as claimed in claim 2, wherein:
the prism angles are 90 degrees, 101.45 degrees, 101.05 degrees, 112.5 degrees, and 135 degrees, respectively;
the light emitting surface and the optical axis intersect at a second intersection point;
an outermost edge of the effective optical diameter of the light incident surface and the second intersection point form a first virtual edge;
the first virtual edge forms a first angle with the optical axis;
the light incident surface and the optical axis intersect at a first intersection point;
an outermost edge of the effective optical diameter of the light emitting surface and the first intersection point form a second virtual edge;
the second virtual edge forms a second angle with the optical axis; and
the first angle is more than or equal to 15 degrees and less than or equal to 17 degrees or the second angle is more than or equal to 28 degrees and less than or equal to 31 degrees.

4. The lens assembly for display as claimed in claim 3, wherein the lens assembly for display satisfies at least one of following conditions:

$$0.96 \text{ degrees/mm} \leq A_1/f_{123} \leq 1.07 \text{ degrees/mm};$$

$$1.78 \text{ degrees/mm} \leq A_2/f_{123} \leq 2.04 \text{ degrees/mm};$$

wherein $A_1$ is an angle of the first angle, $A_2$ is an angle of the second angle, and $f_{123}$ is the effective focal length of the lens assembly.

5. The lens assembly for display as claimed in claim 2, wherein:
the lens assembly further comprises a first lens, a second lens, and a third lens, all of which are arranged in order along the optical axis;
the second lens is disposed between the first lens and the third lens;
the first lens comprises a first light incident surface, and the first light incident surface is the light incident surface of the lens assembly;
the third lens comprises a third light emitting surface, and the third light emitting surface is the light emitting surface of the lens assembly;
the prism assembly further comprises a roof prism which comprises a ninth surface, a tenth surface, and a ridge surface, wherein the ninth surface faces the second surface;
a third light beam enters the first prism through the first surface is totally reflected from the second surface to the optical multilayer film, the optical multilayer film allows the third light beam to pass through and enters the second prism through the fifth surface, and exits the second prism by the seventh surface; and
the part of the first light beam exits the first prism by the second surface and enters the roof prism through the ninth surface.

6. The lens assembly for display as claimed in claim 1, wherein;
the second prism comprises a plurality of prism angles and at least one of the prism angles is more than or equal to 90 degrees and less than or equal to 135 degrees;
the optical multilayer film covers the third surface; and
the lens assembly for display satisfies:

$$1.10 \leq D_{out}/TTL \leq 1.25;$$

wherein $D_{out}$ is an effective optical diameter of the eighth surface and TTL is the interval from the light incident surface to the light emitting surface along the optical axis.

7. The lens assembly for display as claimed in claim 1, wherein:
the second prism comprises a plurality of prism angles and at least one of the prism angles is more than or equal to 90 degrees and less than or equal to 135 degrees;
the light emitting surface and the optical axis intersect at a second intersection point;
an outermost edge of the effective optical diameter of the light incident surface and the second intersection point form a first virtual edge;
the first virtual edge forms a first angle with the optical axis;
the light incident surface and the optical axis intersect at a first intersection point;
an outermost edge of the effective optical diameter of the light emitting surface and the first intersection point form a second virtual edge;
the second virtual edge forms a second angle with the optical axis; and
the first angle is more than or equal to 15 degrees and less than or equal to 17 degrees or the second angle is more than or equal to 28 degrees and less than or equal to 31 degrees.

8. The lens assembly for display as claimed in claim 7, wherein:
the second prism comprises a plurality of prism angles and the prism angles are 90 degrees, 101.45 degrees, 101.05 degrees, 112.5 degrees, and 135 degrees, respectively; and
the lens assembly for display satisfies at least one of following conditions:

$$0.96 \text{ degrees/mm} \leq A_1/f_{123} \leq 1.07 \text{ degrees/mm};$$

$$1.78 \text{ degrees/mm} \leq A_2/f_{123} \leq 2.04 \text{ degrees/mm};$$

wherein $A_1$ is an angle of the first angle, $A_2$ is an angle of the second angle, and $f_{123}$ is an effective focal length of the lens assembly.

9. The lens assembly for display as claimed in claim 1, wherein:
the second prism comprises a plurality of prism angles and at least one of the prism angles is more than or equal to 90 degrees and less than or equal to 135 degrees;
the prism assembly further comprises a roof prism which comprises a ninth surface, a tenth surface, and a ridge surface, wherein the ninth surface faces the second surface;
a third light beam enters the first prism through the first surface is totally reflected from the second surface to the optical multilayer film, the optical multilayer film allows the third light beam to pass through and enters the second prism through the fifth surface, and exits the second prism by the seventh surface; and
the part of the first light beam exits the first prism by the second surface and enters the roof prism through the ninth surface.

10. The lens assembly for display as claimed in claim 9, wherein the second prism comprises a plurality of prism angles and the prism angles are 90 degrees, 101.45 degrees, 101.05 degrees, 112.5 degrees, and 135 degrees, respectively.

11. A lens assembly for display comprising:
a display which emits a first light beam;
a lens assembly which comprises a light incident surface and a light emitting surface, both of which are arranged in order along an optical axis, wherein the first light beam enters the lens assembly through the light incident surface and exits the lens assembly by the light emitting surface; and
a prism assembly which comprises a first prism, a second prism, and an optical multilayer film, wherein the first prism comprises a first surface, a second surface, and a third surface; the second prism comprises a fourth surface, a fifth surface, a sixth surface, a seventh surface, and an eighth surface; the fifth surface faces the third surface; and the optical multilayer film is disposed between the third surface and the fifth surface;
wherein a second light beam enters the first prism through the first surface are totally reflected from the second surface to the optical multilayer film, the optical multilayer film reflects a part of the second light beam causing the part of the second light beam to exit the first prism by the second surface;
wherein the first light beam exits the lens assembly, and enters the second prism through the eighth surface, and exits the second prism by the fifth surface, and enters the first prism through the optical multilayer film, the optical multilayer film allows a part of the first light beam to pass through, finally, the part of the first light beam exits the first prism by the second surface, where the part of the second light beam and the part of the first light beam coincide on the second surface;
wherein the lens assembly for display satisfies:

$$1.10 \leq D_{out}/TTL \leq 1.25;$$

wherein $D_{out}$ is an effective optical diameter of the eighth surface and TTL is an interval from the light incident surface to the light emitting surface along the optical axis.

12. The lens assembly for display as claimed in claim 11, wherein:
the second prism comprises a plurality of prism angles and at least one of the prism angles is more than or equal to 90 degrees and less than or equal to 135 degrees;
the optical multilayer film covers the third surface; and
the lens assembly for display satisfies at least one of following conditions:

$$0.60 \leq D_{in}/TTL \leq 0.75;$$

$$4.56 \text{ mm} \leq D_{in} \leq 5.02 \text{ mm};$$

wherein $D_{in}$ is an effective optical diameter of the light incident surface and TTL is the interval from the light incident surface to the light emitting surface along the optical axis.

13. The lens assembly for display as claimed in claim 12, wherein:
the prism angles are 90 degrees, 101.45 degrees, 101.05 degrees, 112.5 degrees, and 135 degrees, respectively; and
the lens assembly for display satisfies at least one of following conditions:

$$0.28 \leq D_{in}/f_{123} \leq 0.35;$$

$$0.50 \leq D_{out}/f_{123} \leq 0.57;$$

wherein $D_{in}$ is the effective optical diameter of the light incident surface, $D_{out}$ is the effective optical diameter of the eighth surface, and $f_{123}$ is an effective focal length of the lens assembly.

14. The lens assembly for display as claimed in claim 13, wherein:
the light emitting surface and the optical axis intersect at a second intersection point;
an outermost edge of the effective optical diameter of the light incident surface and the second intersection point form a first virtual edge;
the first virtual edge forms a first angle with the optical axis;
the light incident surface and the optical axis intersect at a first intersection point;
an outermost edge of the effective optical diameter of the light emitting surface and the first intersection point form a second virtual edge;
the second virtual edge forms a second angle with the optical axis; and
the first angle is more than or equal to 15 degrees and less than or equal to 17 degrees or the second angle is more than or equal to 28 degrees and less than or equal to 31 degrees.

15. The lens assembly for display as claimed in claim 14, wherein the lens assembly for display satisfies at least one of following conditions:

$$0.96 \text{ degrees/mm} \leq A_1/f_{123} \leq 1.07 \text{ degrees/mm};$$

$$1.78 \text{ degrees/mm} \leq A_2/f_{123} \leq 2.04 \text{ degrees/mm};$$

wherein $A_1$ is an angle of the first angle, $A_2$ is an angle of the second angle, and $f_{123}$ is the effective focal length of the lens assembly.

16. The lens assembly for display as claimed in claim 12, wherein:
the light emitting surface and the optical axis intersect at a second intersection point;
an outermost edge of the effective optical diameter of the light incident surface and the second intersection point form a first virtual edge;
the first virtual edge forms a first angle with the optical axis;
the light incident surface and the optical axis intersect at a first intersection point;
an outermost edge of the effective optical diameter of the light emitting surface and the first intersection point form a second virtual edge;
the second virtual edge forms a second angle with the optical axis; and
the first angle is more than or equal to 15 degrees and less than or equal to 17 degrees or the second angle is more than or equal to 28 degrees and less than or equal to 31 degrees.

17. The lens assembly for display as claimed in claim 16, wherein the lens assembly for display satisfies at least one of following conditions:

$$0.96 \text{ degrees/mm} \leq A_1/f_{123} \leq 1.07 \text{ degrees/mm};$$

$$1.78 \text{ degrees/mm} \leq A_2/f_{123} \leq 2.04 \text{ degrees/mm};$$

wherein $A_1$ is an angle of the first angle, $A_2$ is an angle of the second angle, and $f_{123}$ is an effective focal length of the lens assembly.

18. The lens assembly for display as claimed in claim 12, wherein:
   the prism assembly further comprises a roof prism which comprises a ninth surface, a tenth surface, and a ridge surface, wherein the ninth surface faces the second surface;
   a third light beam enters the first prism through the first surface is totally reflected from the second surface to the optical multilayer film, the optical multilayer film allows the third light beam to pass through and enters the second prism through the fifth surface, and exits the second prism by the seventh surface; and
   the part of the first light beam exits the first prism by the second surface and enters the roof prism through the ninth surface.

19. The lens assembly for display as claimed in claim 11, wherein:
   the lens assembly further comprises a first lens, a second lens, and a third lens, all of which are arranged in order along the optical axis;
   the second lens is disposed between the first lens and the third lens;
   the first lens comprises a first light incident surface, and the first light incident surface is the light incident surface of the lens assembly;
   the third lens comprises a third light emitting surface, and the third light emitting surface is the light emitting surface of the lens assembly;
   the prism assembly further comprises a roof prism which comprises a ninth surface, a tenth surface, and a ridge surface, wherein the ninth surface faces the second surface;
   a third light beam enters the first prism through the first surface is totally reflected from the second surface to the optical multilayer film, the optical multilayer film allows the third light beam to pass through and enters the second prism through the fifth surface, and exits the second prism by the seventh surface; and
   the part of the first light beam exits the first prism by the second surface and enters the roof prism through the ninth surface.

\* \* \* \* \*